FREQUENCY CONVERTING DEVICE

Filed Jan. 4, 1947 2 SHEETS—SHEET 1

INVENTOR
JOSEPH C. FERGUSON

BY [signature]

ATTORNEY

Jan. 22, 1952 J. C. FERGUSON 2,582,977

FREQUENCY CONVERTING DEVICE

Filed Jan. 4, 1947 2 SHEETS—SHEET 2

INVENTOR
JOSEPH C. FERGUSON

BY [signature]

ATTORNEY

Patented Jan. 22, 1952

2,582,977

UNITED STATES PATENT OFFICE 2,582,977

FREQUENCY CONVERTING DEVICE

Joseph C. Ferguson, Fort Wayne, Ind., assignor, by mesne assignments, to Farnsworth Research Corporation, a corporation of Indiana Application January 4, 1947, Serial No. 720,265

14 Claims. (Cl. 250—36)

This invention relates to frequency converting systems and particularly to a frequency multiplying tube of the cathode ray type.

In a conventional frequency multiplier of the cathode ray type an electron beam is deflected by a rotating electric or magnetic field in a circular path over a target having a plurality of apertures. The frequency of the output wave accordingly depends on the frequency of the beam deflecting or input wave and on the number of apertures in the target. For many applications a frequency multiplier is required which develops output waves of different frequencies. Since the number of apertures in the target of a cathode ray tube cannot be changed without taking the tube apart, the frequency of the output wave can only be changed by varying the frequency of the input wave. This, however, is impractical in many cases and not feasible for certain applications. In a superheterodyne receiver, for example, a large number of waves of different frequencies must be developed for converting the received modulated-carrier wave into the required intermediate-frequency signal. The channels allocated for the transmission of frequency-modulated carrier waves are in the megacycle region, and therefore, a variable oscillator of the type used in a conventional superheterodyne receiver is not satisfactory in connection with an F. M. receiver in view of its unreliability at such high frequencies. It is, therefore, desirable to provide a frequency multiplier which will develop an output wave, the frequency of which may be varied in steps corresponding to those required for the conversion of a modulated-carrier wave to an intermediate-frequency signal in a superheterodyne F. M. receiver. The input wave of the frequency multiplier preferably has a constant frequency and may be derived from a crystal controlled oscillator. By varying the multiplying ratio of the frequency multiplier, the desired output waves should be obtainable without varying the frequency of the input wave. If the multiplication ratio of the frequency multiplier is varied while the frequency of the input wave also varies at a predetermined rate with respect to time, a sweep generator may be obtained having a frequency range which is considerably larger than that of the input wave. Such a sweep generator is useful for measuring, testing or alignment purposes.

It is an object of the present invention, therefore, to provide a novel frequency converter for multiplying or dividing the frequency of an input wave or for converting a frequency-modulated input wave into a frequency-modulated output wave of multiplied frequency.

Another object of the invention is to provide a frequency multiplier arranged for multiplying the frequency of an input wave in steps by changing the multiplication ratio of the multiplier without the necessity of changing the frequency of the input wave.

A further object of the invention is to provide a sweep generator arranged for changing the frequency of an input wave by different multiplying ratios, the frequency of the input wave varying at a predetermined rate with respect to time.

Still a further object of the invention is to provide a frequency converter which permits to multiply or divide at will the frequency of a pulsed input signal.

In accordance with the present invention there is provided a frequency multiplying system comprising a plurality of electron sources which may be arranged in a closed path for developing a plurality of electron beams. There is further provided means for cyclically deflecting the beams through predetermined deflection paths. Finally there is provided means in the deflection paths for collecting the electrons from the beams in succession to obtain an output signal at a frequency determined by the number of the electron beams multiplied by the rate of deflection thereof.

For a better understanding of the invention, together with other and further objects thereof, reference is made to the following description, taken in connection with the accompanyinng drawings, and its scope will be pointed out in the appended claims.

Figure 1:
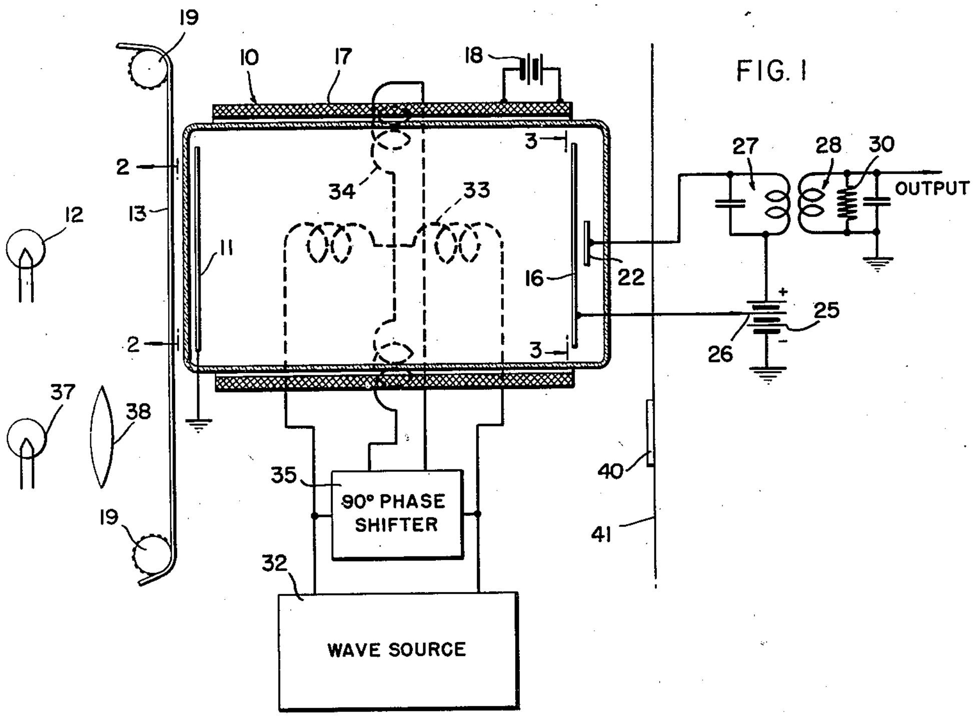
Fig. 1 illustrates a frequency multiplying device embodying the present invention and adapted particularly for use in a superheterodyne receiver.
Figure 2:
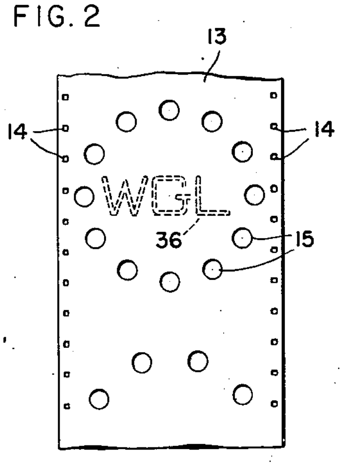
Fig. 2 is a view taken on line 2—2 of Fig. 1 illustrating a film bearing a circularly arranged series of transparent dots utilized for developing a plurality of electron beams.

Referring now to the drawings, in which like components have been designated by the same reference numerals throughout the figures, and particularly to Fig. 1, there is illustrated frequency multiplying tube 10 comprising photocathode 11 which may be grounded as shown. Light source 12 projects light on photosensitive cathode 11 through film 13 shown in greater detail in Fig. 2. Film 13 which may have sprocket holes 14 is provided with a series of circularly arranged transparent portions or dots 15. Film 13 may be positioned in front of photosensitive cathode 11 by means of sprocket wheels 19. During the operation of tube 10, film 13 is stationary. With the exception of transparent dots 15 film 13 is opaque and may therefore be replaced by any opaque material such, for example, as a metallic sheet having transparent dots or holes 15. Accordingly, light from light source 12 will fall on photocathode 11 through transparent dots 15 to develop a plurality of electron beams which are arranged in a circle with respect to a plane parallel to cathode 11.

These electron beams are focused on target 16 by means of magnetic focusing coil 17 which may be energized by a suitable current source such, for example, as battery 18. Target 16 is shown particularly in Fig. 3 and comprises aperture 20. The electrons passing through aperture 20 are collected by collector electrode 22 as shown in Figs. 1 and 3.

Target 16 and collector electrode 22 are supplied with operating potentials from a suitable voltage source such, for example, as battery 25 having its negative terminal grounded. Target 16 is maintained at a positive potential with respect to photocathode 11 by tap 26 on battery 25, while collector electrode 22 is supplied with a still higher positive potential through tuned circuit 27 connected to the positive terminal of battery 25. The output signal may be obtained from tuned output circuit 28 which may be damped by resistor 30 to provide broad tuning.

The electron beams developed by the light falling on photocathode 11 and focused on target 16 are cyclically deflected across aperture 20. To this end there is provided wave source 32 having its output connected to horizontal deflecting coils 33 while vertical deflecting coils 34 are connected to the output of wave source 32 through 90 degrees phase shifter 35. When deflecting coils 33 and 34 are arranged at right angles to each other and when the amplitudes of the two sinusoidal waves impressed upon deflecting coils 33 and 34 are equal, a rotating electromagnetic field will be developed in tube 10 which will deflect each of the electron beams through a circular path. It is to be understood that the path of the electron beams need not be perfectly circular as long as the electron beams are swept at a constant velocity across aperture 20 of target 16.

Figure 3:
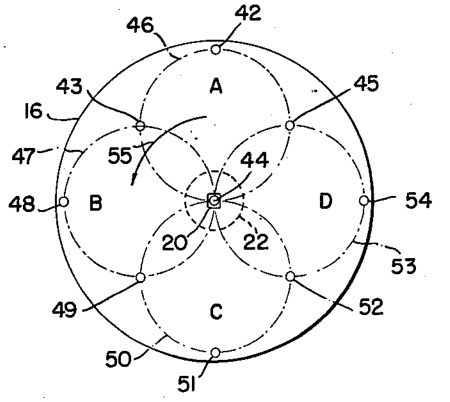
Fig. 3 is a view on enlarged scale taken on line 3—3 of Fig. 1 of the apertured target used in the tube of Fig. 1 and illustrating the paths of the electron beams.

Referring to Fig. 3, the images of four electron beams 42, 43, 44 and 45 at a certain instant have been shown by way of example on target 16. Electron beam 44 just passes through aperture 20 in target 16. The four electron beams 42 to 45 are arranged along circle 46. The rotating electromagnetic field developed in tube 10 will deflect electron beams 42 to 45 in the direction shown by arrow 55. After a certain period of time, the four electron beams 42 to 45 are arranged along circle 47. Original electron beam 42 is deflected into position 43, while original electron beam 43 is deflected into position 48. Similarly, original electron beam 44 is deflected into position 49, while original electron beam 45 is deflected into position 44, and accordingly now passes across aperture 20. Sometime later the four electron beams are arranged along circle 50. Electron beams 43, 48, 49 and 44 on circle 47 correspond, respectively, to electron beams 44, 49, 51 and 52 on circle 50. After another interval of time, the electron beams are arranged along circle 53 whereby electron beams 44, 49, 51 and 52 correspond, respectively, to electron beams 45, 44, 52 and 54.

It will accordingly be seen that original electron beam 42 is successively deflected along circle 46 and eventually is swept past aperture 20. Original electron beam 43 is deflected in a circular path along circle 47, and so on. Each of the four electron beams 42 to 45 is thus deflected through a circle, the circles being congruent and of the same diameter, and having a common intersecting point where aperture 20 is provided so that each of the four electron beams is eventually swept past aperture 20.

Every time one of the electron beams 42 to 45 shown in Fig. 3 is swept across aperture 20 a pulsed or interrupted electron stream will be collected by collector electrode 22 which is converted into a sinusoidal wave by tuned circuit 27. The frequency of the output signal is determined by the number of electron beams and by the rate of deflection of the beams, that is, by the frequency of the input wave developed by wave source 32. The number of electron beams developed in tube 10 is determined by the number of transparent dots 15 on film 13. Each of these factors may be changed to vary the frequency of the output wave.

Frequency multiplying tube 10 of Fig. 1 may be used in accordance with the present invention in a superheterodyne F. M. receiver for developing output waves at the frequencies required for converting the received carrier wave to an intermediate-frequency signal. The channels allocated for the transmission of frequency-modulated carrier waves are provided from 88 to 106 megacycles, the carrier waves of different stations being spaced apart by 200 kilocycles so that the number of transmission channels is 90. The F. M. receiver, accordingly must have means for developing output waves at 90 different frequencies. Assuming an intermediate frequency of 10 megacycles, 90 output waves are required having frequencies from 78 to 96 megacycles and spaced apart by 200 kilocycles.

For developing these output waves frequency multiplying tube 10 may be used with advantage. Film 13 may be provided with 90 different arrangements or groups of transparent dots, such as shown at 15, the number of dots of each group varying from 390 to 480. A film frame is positioned by means of sprocket wheels 19 in front of photocathode 11 bearing a number of transparent dots which corresponds to the desired output frequency. The frequency of wave source 32 preferably is fixed at 200 kilocycles and may be obtained from a crystal controlled oscillator. The output frequency will accordingly vary from $390\times.2$ or 78 megacycles to $480\times.2$ or 96 megacycles. The number of transparent dots 15 varies by one for adjacent frames so that 90 output waves of different frequencies may be obtained.

It is also feasible to exhibit the call letters of the station tuned in by means of film 13. To this end the call letters of a station such, for example, as WGL shown at 36 in Fig. 2 may be provided on film 13 as transparent areas. The station call letters may be projected by light source 37 and lens system 38 on frosted window 40 which may be provided on the front panel of the receiver indicated at 41. The call letters of the station such as 36 should correspond to the frequency of the output wave obtained by the dots 15 of the adjacent film frame which is positioned in front of photocathode 11. Frequency multiplying tube 10 may also be used in a transmitter station for obtaining carrier waves of different frequencies, or else the tube may be used for developing a wave of any desired frequency such as the line scanning wave utilized in a television system.

Furthermore, it is feasible to vary the frequency of the wave developed by source 32 at a constant rate with respect to time which will change the frequency of the output wave derived from tube 10. Thus, for example, tube 10 may be utilized as a sweep generator which may be used for testing or measuring purposes or in the alignment of radio or television receivers. Supposing, for example, the frequency of the wave developed by source 32 varies from .05 to .1 megacycle at a constant rate in a predetermined time, this frequency may now be multiplied successively by the factors 1, 2, 4, 8, 16, 32, 64 and so on, by providing film frames having a number of dots corresponding to the multiplication factor. The frequency of the output wave thus obtained may vary from .05 to 6.4 megacycles or more, depending upon the number of dots 15 provided on the film frame positioned in front of cathode 11.

Figure 4:
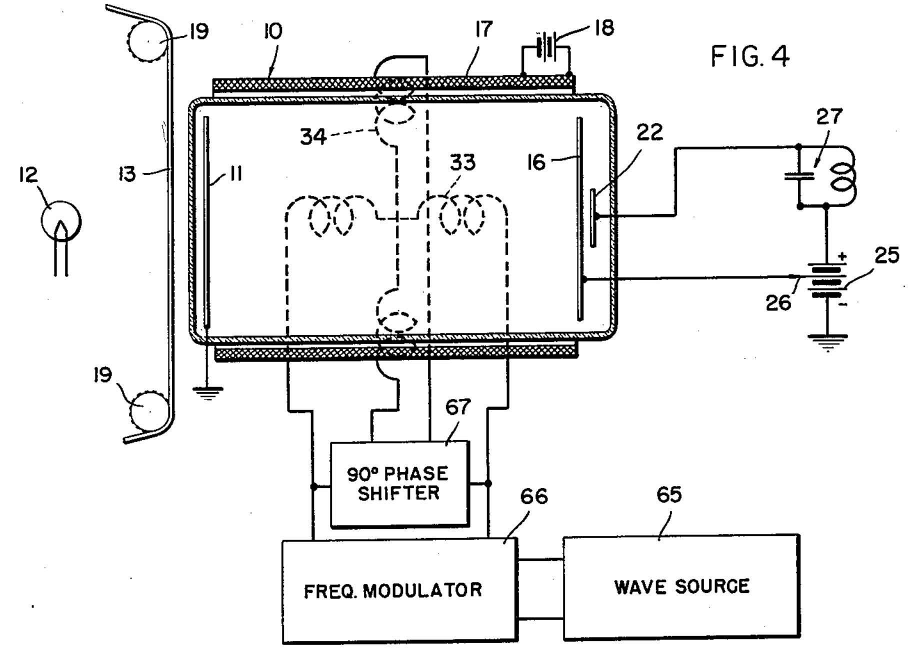
Fig. 4 illustrates a device in accordance with the invention for multiplying the frequency of a frequency-modulated input wave.

Referring now to Fig. 4, there is illustrated a frequency multiplier comprising tube 10 which may be identical with tube 10 of Fig. 1. The frequency multiplier of Fig. 4 is arranged for multiplying the frequency of a frequency-modulated input wave. Wave source 65 may develop a carrier wave, the frequency of which is modulated by frequency modulator 66 in accordance with a modulation signal. The frequency-modulated output wave obtained from frequency modulator 66 is impressed on horizontal deflecting coils 33, while vertical deflecting coils 34 are connected to modulator 66 through 90 degrees phase shifter 67. The frequency of wave source 65 is multiplied in accordance with the number of transparent dots 15 on film 13. The electron beams represented in Fig. 3 by dots 42 to 46 are deflected across aperture 20 at a speed which varies with the modulation signal in accordance with which the input wave has its frequency modulated. The output wave developed across tuned circuit 27 will accordingly be a frequency-modulated wave having a center frequency determined by the frequency of wave source 65, and the number of transparent dots 15 on film 13.

Figure 5:
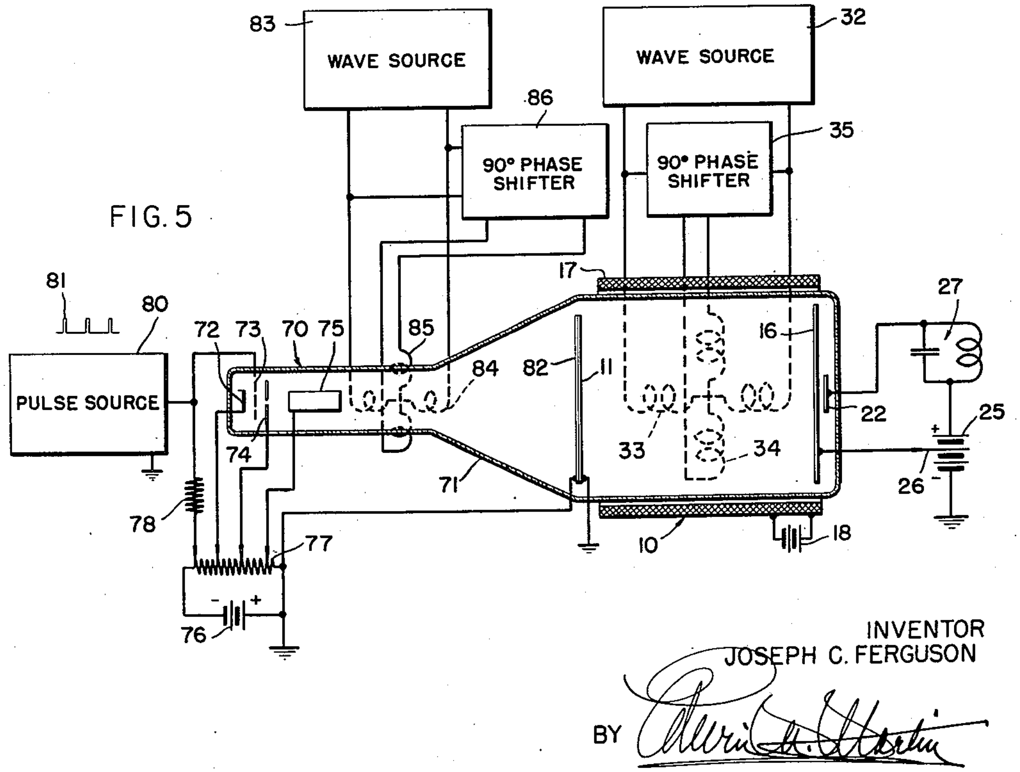
Fig. 5 illustrates a frequency converter tube embodying this invention and arranged for either multiplying or dividing the frequency of an input signal which may consist of pulses.

Referring now to Fig. 5 there is illustrated frequency converter 70 which may be used for either multiplying or dividing the frequency of an input wave which may consist of pulses. Frequency converter 70 comprises cathode ray tube 71 including an electron gun which is provided with cathode 72, control grid 73, first anode 74 and second anode 75. Operating potentials are supplied to the electrodes of the electron gun through a suitable voltage source, such as battery 76 having its terminals connected across voltage divider 77. Control grid 73 is provided with grid leak resistor 78 across which an input signal is applied which may be developed by pulse source 80 and which may consist of positive pulses indicated at 81. The electron beam developed by the electron gun is focused on luminescent screen 82. The electron beam is rotated in a circular path across luminescent screen 82 by means of a sinusoidal wave developed by wave source 83 and impressed upon horizontal deflecting coils 84. The same wave is also impressed on vertical deflecting coils 85 shifted in phase through 90 degrees by phase shifter 86.

The electron beam is accordingly continuously rotated across luminescent screen 82 and is interrupted by pulses 81 at a predetermined rate so that a series of luminescent interrupted areas is developed on screen 82. If $n$ is the number of pulses 81 per second and if $f_1$ is the frequency of the wave developed by source 83, $n/f_1$ luminescent areas are developed on screen 82, where $n/f_1$ should be an integer. Wave source 83 and pulse source 80 may accordingly be synchronized with each other so that the ratio $n/f_1$ remains at a predetermined value. The luminescent areas developed on screen 82 are used in frequency multiplier 10 for developing a number of electron beams corresponding to the number of luminescent areas on screen 82. To this end photocathode 11 is arranged adjacent to luminescent screen 82 to receive light from screen 82. The operation of frequency multiplying tube 10 is the same as previously explained.

If the frequency of the wave developed by wave source 32 is $f_2$, the frequency of the output pulses developed in tuned circuit 27 is $nf_2f_1$. When the ratio $f_2/f_1$ is larger than 1, the frequency converter of Fig. 5 will multiply the frequency of input pulses 81 by that factor. On the other hand, if the ratio $f_2/f_1$ is smaller than 1, the frequency of the input pulses is divided by the ratio of the two frequencies $f_1$ and $f_2$. By varying the frequency of the wave developed, either by wave source 32 or by source 83, the frequency converter may be utilized for either multiplying or dividing the frequency of the input pulses. By way of example it may be assumed that the frequency of the wave developed by source 83 is 60 cycles, while $n$, the number of pulses 81 per second, is 6,000. Accordingly 6,000/60 luminescent areas or 100 areas are formed on screen 82. If the frequency of the wave developed by source 32 is 100 kilocycles, the output frequency will be 6,000/60×100,000 or 10 megacycles.

It is to be understood that the electron beams may also be developed in the frequency converter of the invention, by other means. In some applications it may not be necessary to vary the frequency of the output wave so that the number of dots 15 need not be changed. In that case it is, for example, feasible to provide a cathode bearing a number of circularly arranged electron emissive areas which may either consist of photosensitive material or of a thermionic emissive material. The electron beams may either be developed by projecting light on the photosensitive areas or by heating the thermionic emissive areas in a suitable manner.

It is furthermore to be understood that an electron multiplier may be provided, for example, between target 16 and collector electrode 22 of tube 10 for amplifying the output signal, as is conventional in a cathode ray tube.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A frequency multiplying system comprising means for simultaneously producing a plurality of separate electron beams including a plurality of identical and discrete electron sources and means for forming the electrons from each source into a separate beam, means for cyclically deflecting said beams through predetermined paths of deflection, and means in said paths of deflection for collecting the electrons from said beams in succession to obtain an output signal at a frequency determined by the number of said beams multiplied by the rate of deflection thereof.

2. A frequency multiplying system comprising means for simultaneously producing a plurality of separate electron beams including a plurality of identical and discrete electron sources arranged in a closed path and means for forming the electrons from each source into a separate beam, means for cyclically deflecting said beams through closed paths of deflections, and a collector electrode in said paths of deflection for collecting the electrons from each of said beams in succession to obtain an output signal at a frequency determined by the number of said beams multiplied by the rate of deflection thereof.

3. A frequency multiplying system comprising means for producing simultaneously a plurality of separate electron beams including a plurality of identical and discrete electron sources, a target having an aperture, and means for forming and focusing said beams on said target, means for cyclically and successively deflecting said beams across said aperture, and means for collecting the electrons passing through said aperture to obtain an output signal at a frequency determined by the number of said beams multiplied by the rate of deflection thereof.

4. A frequency multiplying system comprising means for producing simultaneously a plurality of separate electron beams including a plurality of identical and discrete electron sources arranged in a closed path, a target having an aperture, and means for forming and focusing said beams on said target, means for cyclically and successively deflecting said beams across said aperture, and means for collecting the electrons passing through said aperture to obtain an output signal at a frequency determined by the number of said beams multiplied by the rate of deflection thereof.

5. A frequency multiplying device comprising means for producing simultaneously a plurality of separate electron beams including a plurality of identical and discrete electron sources arranged substantially in a circle, a target having an aperture, and means for forming and focusing said beams on said target, means for deflecting said beams across said aperture in a closed path, and means for collecting the electrons passing through said aperture to derive an output signal at a frequency determined by the number of said beams multiplied by the rate of deflection thereof.

6. A frequency multiplying system according to claim 1 wherein said beam producing means includes means for varying the number of electron sources and the number of beams produced.

7. A frequency multiplying device comprising means for producing simultaneously a plurality of separate electron beams including a plurality of identical and discrete electron sources arranged substantially in a circle, a target having an aperture, and means for forming and focusing said beams on said target, means, including a source of a sinusoidal wave of fixed frequency used as deflecting energy, for deflecting each of said beams across said aperture in a substantially circular path, said paths being of equal diameter and having a common intersecting point on said target where said aperture is provided, and a collector electrode for collecting electrons passing through said aperture to derive an output signal at a frequency determined by the number of said beams multiplied by the frequency of said wave.

8. A frequency multiplying device comprising means for producing simultaneously a plurality of separate electron beams including a photocathode, means for projecting a plurality of identical and discrete light beams onto said photocathode to develop simultaneously a plurality of sources of photoelectrons and means for forming and focusing the photoelectrons from each of said sources into separate beams, means for deflecting said electron beams through predetermined paths of deflection, and a collector electrode disposed in said paths of deflection for collecting in succession the electrons from each of said beams, thereby to derive an output signal having a frequency determined by the number of said light beams multiplied by the rate of deflection of said electron beams.

9. A frequency multiplying device comprising means for producing simultaneously a plurality of separate electron beams including a photocathode, an opaque material bearing groups of transparent portions, each group having a predetermined number of transparent portions, means for positioning a selected group of said portions in front of said photocathode, means for projecting light through the selected group of said transparent portions onto said photocathode to develop a number of sources of photoelectrons, a target having an aperture, and means for forming and focusing said beams on said target, means for deflecting each of said beams across said aperture, and a collector electrode for collecting the electrons passing through said aperture, thereby to derive an output signal having a frequency determined by the number of transparent portions in the selected group multiplied by the rate of deflection of said beams.

10. The method of multiplying the frequency of a wave which comprises the steps of developing simultaneously a plurality of identical and discrete electron beams, cyclically deflecting said beams across a fixed point in a plane, and collecting the electrons passing said fixed point to develop an output signal at a frequency which is the product of the number of said beams and the rate of deflection thereof.

11. The method of multiplying the frequency of a wave which comprises the steps of developing simultaneously a plurality of identical and discrete electron beams arranged substantially in a circle, developing a rotating electromagnetic field to cyclically deflect each of said beams in a circular path across a fixed point in a plane, and collecting the electrons passing said fixed point to develop an output signal at a frequency which is the product of the number of said beams and the rate of rotation of said field.

12. The method of multiplying the frequency of a wave which comprises the steps of developing simultaneously a plurality of identical and discrete electron beams arranged substantially in a circle, utilizing a sinusoidal frequency-modulated input wave for cyclically deflecting each of said beams in a circular path across a selected elemental area in a plane, and collecting the electrons passing said area to develop an output signal at a center frequency which is the product of the number of said beams and the mean frequency of said input wave.

13. The method of multiplying the frequency of a wave which comprises the steps of developing simultaneously a plurality of identical and discrete electron beams arranged substantially in a circle, utilizing a sinusoidal input wave having a frequency which varies at a constant predetermined rate with time to develop a rotating electromagnetic field, passing said beams through said field to deflect each of said beams in a circular path across a selected elemental area in a plane, and collecting the electrons passing said area to develop an output signal at a frequency which is determined by the number of said beams multiplied by the instantaneous frequency of said input wave.

14. The frequency multiplying device according to claim 7 further including means for varying the frequency of the sinusoidal wave from said source in accordance with a signal.

JOSEPH C. FERGUSON.

REFERENCES CITED

The following references are of record in the file of this patent:

UNITED STATES PATENTS

| Number | Name | Date |
|---|---|---|
| Re. 21,504 | Farnsworth | July 9, 1940 |
| 2,026,892 | Heintz | Jan. 7, 1936 |
| 2,071,515 | Farnsworth | Feb. 23, 1937 |
| 2,405,519 | Rajchman | Aug. 6, 1946 |
| 2,418,574 | Cawein | Apr. 8, 1947 |
| 2,422,236 | Hallmark | June 17, 1947 |
| 2,432,654 | Buckbee | Dec. 16, 1947 |
| 2,434,446 | Toulon | Jan. 13, 1948 |